March 18, 1958     C. D. PETERSON     2,827,069
GAS PRESSURE REGULATOR WITH INTERNAL RELIEF VALVE
Filed Nov. 6, 1951                         2 Sheets-Sheet 1
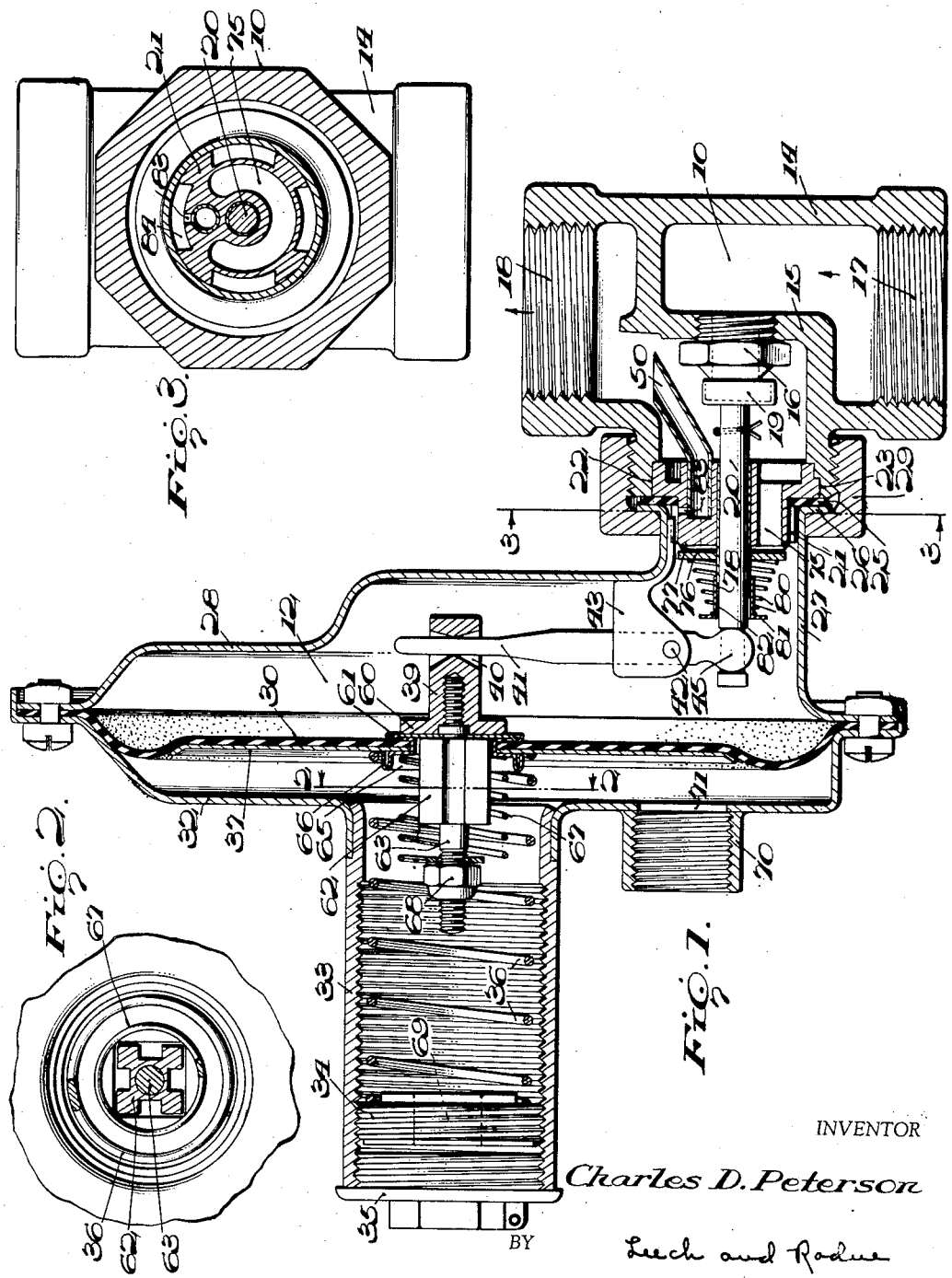
INVENTOR
Charles D. Peterson
BY
Leech and Radue
ATTORNEY

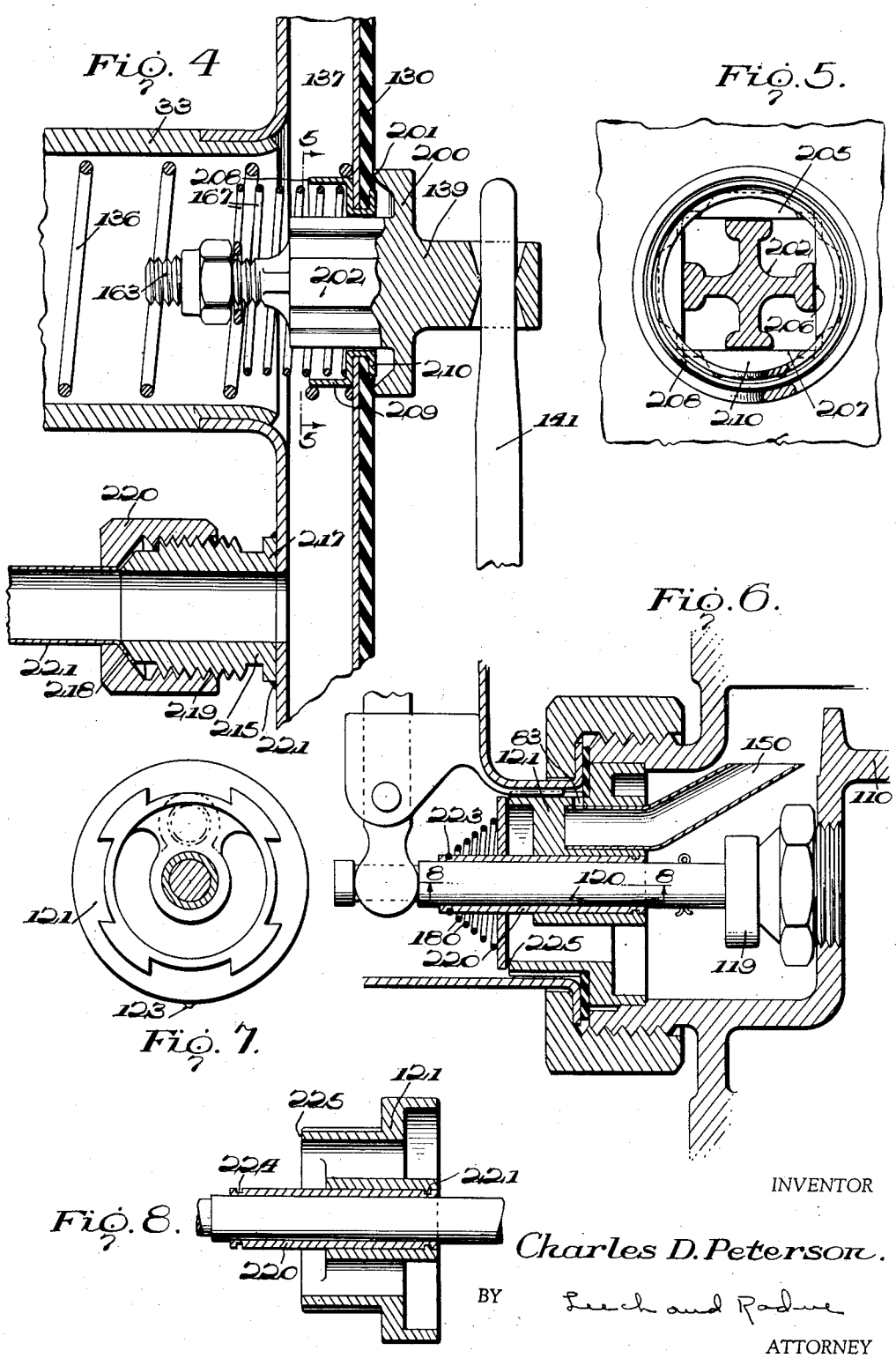

United States Patent Office 2,827,069
Patented Mar. 18, 1958

2,827,069

GAS PRESSURE REGULATOR WITH INTERNAL RELIEF VALVE

Charles D. Peterson, Dallas, Tex., assignor to Universal Controls Corporation, Dallas, Tex., a corporation of Texas Application November 6, 1951, Serial No. 255,061

6 Claims. (Cl. 137—116.5)

This invention relates to a relief system for gas service pressure regulators, and more particularly to such system for use with Pitot tube equipped regulators whereby they may be fitted with a single, multi-purpose vent opening.

It is a general object of the present invention to provide a novel and improved relief valve system for gas service pressure regulators.

More particularly it is an object of this invention to provide, in a gas service pressure regulator of the Pitot tube equipped type having a relief valve incorporated in the diaphragm structure, a by-pass check valve between the regulated pressure side of the valve fitting and the operating side of the diaphragm housing.

An important object of this invention consists in the arrangement of a relief valve at the junction of the diaphragm and its post, making use of the resilient material of the diaphragm to engage in a fluid tight manner with a suitable valve seat on the post, together with guide means for the post passing through the diaphragm.

Another important object of the invention consists in the construction and arrangement of a grommet for securing together the borders of the central gas passages through the diaphragm and backing plate and serving to centralize both the main spring and the relief valve spring.

A further important object of the invention resides in the provision of a relief check valve by-passing the Pitot tube and arranged to open upon a preponderance of pressure in the discharge side of the valve fitting over that on the working side of the diaphragm.

Other and further objects and features of the invention will be more apparent to those skilled in the art upon a consideration of the accompanying drawings and following specification wherein is disclosed several embodiments of the invention, with the understanding that such changes in construction and material may be made therein as come within the scope of the appended claims without departing from the spirit of the invention.

In said drawings:

Fig. 1 is a longitudinal central section through a gas pressure regulator provided with the improved relief valve system;

Fig. 2 is a transverse section taken on line 2—2 of Fig. 1 illustrating the fluted guide for the diaphragm pressure relief valve;

Fig. 3 is a transverse section taken on line 3—3 of Fig. 1 showing the auxiliary gas passages in the regulator valve stem guide piece for cooperation with the check valve.

Fig. 4 is a fragmentary vertical section similar to Fig. 1 on an enlarged scale and illustrating a unitary diaphragm post and relief valve structure;

Fig. 5 is a section on line 5—5 of Fig. 4;

Fig. 6 is a fragmentary vertical section on an enlarged scale of the check valve section of the pressure regulator showing modifications of the elements thereof;

Fig. 7 is an elevation of the valve guide bushing and valve stem guide tube assembly removed from the pressure regulator; and Fig. 8 is a horizontal section taken on line 8—8 of Fig. 6.

In the use of gas pressure regulators in the service lines of individual consumers they are arranged between the service pipe and the meter. In the South and Southwest where the winters are relatively mild the practice is to install both the meter and the gas service pressure regulator out of doors, but in the more rigorous northern climates the practice is almost universal to place both of these units inside of the house. The installation of an out-door service pressure regulator is much simpler because any discharge from relief valves or the like is merely vented directly to the atmosphere. These regulators can therefore be made with several relief and breather ports and/or valves, each individually protected against insects or the like, with no thought given to connecting a vent pipe thereto. However, with inside mounted gas service pressure regulators it is essential that any gas vented through relief valves or breathers where leakage may occur be connected by pipe to the out-doors. In order to simplify the plumbing this pipe should be of large size and lead from a single vent port on the regulator. In accordance with the present invention both the relief valve for preventing excess service pressure, should the control valve be held open by any accidental means, and the vent for the rear face of the diaphragm, which permits breathing and which will discharge gas in the event of diaphragm leakage are arranged to discharge through a single sput on the rear diaphragm cover to which may be connected a single large sized vent pipe with a minimum of installation problems.

The regulator illustrated in the eight figures of the drawing is a modification for indoor use of that disclosed in my copending application Serial No. 737,656, filed March 27, 1947, now Patent 2,577,480, dated December 4, 1951, which illustrates a gas service pressure regulator primarily intended for out-door use.

The pressure regulating equipment per se is not different in the two types of regulators.

The essential pressure reducing features of the regulator result from the assembly of the following parts as shown in Fig. 1. A valve fitting 10 for connection in the service pipe and an operating diaphragm mechanism 12 for opening and closing the valve in accordance with the outlet pressure. The valve structure is built up about a T 14 having a separator or partition 15 therein fitted with the removable valve seat 16. Gas at the pressure of the main enters at 17 and the reduced service pressure gas discharges at 18. Valve disc 19 for cooperation with the seat is mounted to slide with stem 20 passing through stem guide bushing 21 mounted in the neck of the T where it is recessed in counterbore 22 and insured of only one positioning therein by lug 23 received in a groove in the wall of the counterbore.

A packing washer 25 rests jointly on a shoulder of the bushing and on the coplanar end of the T neck and is abutted by the outwardly turned flange 26 on the sput 27 necked out from the front half 28 of the sheet metal diaphragm casing. The union nut 29 serves to clamp flange 26 against the end of the Tee and form a gas-tight joint.

The flexible diaphragm 30 of synthetic rubber or other material unaffected by the components of the gas has its periphery clamped between the flanges on the edges of front diaphragm shell 28 and back diaphragm shell 32 in the usual manner. This back diaphragm shell is fitted with an elongated central neck or spring tube 33 interiorly threaded for the adjusting ring 34 and the closure cap 35. It houses the main pressure regulating spring 36 bearing at one end on the adjusting ring and at the other end on the backing plate 37 for the diaphragm.

Diaphragm post 39 is transversely drilled by intersecting conical holes 40 to receive and actuate the reduced end of lever 41 pivoted at 42 to bracket 43 welded to the front half of the diaphragm casing. The opposite end of lever 41 is rounded at 45 and received in and cooperates with the opposite walls of a slot in the valve stem 20 actuate it in response to diaphragm movement.

Pitot tube 50 conducts gas from the outlet side 18 of the valve fitting to the front of the diaphragm casing and causes actuation of the regulator in the customary manner. The valve is closed as shown but in the absence of any pressure on the front face of the diaphragm, spring 36 forces the diaphragm to the right and opens the valve 19. Increase in gas pressure on the outlet side is conducted through Pitot tube 50 to the diaphragm chamber and urges the diaphragm toward the left, closing the valve in the amount necessary to produce and maintain the desired discharge pressure in accordance with the setting of the spring 36.

It sometimes happens that in the operation of the regulator a chip or shaving of metal gets between the valve and its seat and prevents closure. Likewise corrosion of the stem of the valve might cause it to stick in its guide. Every precaution must be taken to insure against excess pressure on the outlet side of the valve since domestic appliances and the like intended to operate at a pressure of only several inches of water would be damaged or caused to operate improperly, or possibly have the flame blown out by pressures as great as that on the inlet side of the valve. To prevent such happening it is standard practice to provide some form of relief valve in the pressure regulator to vent off excess pressure from the low pressure side. Such a valve in the present instance is combined with the diaphragm as will now be pointed out and has a flow capacity at least equal to that of the main valve.

The diaphragm post 39 previously referred to has integral flange 60 against the under face of which a stainless steel disc 61 is positioned, having its outer periphery formed into a bead as shown, in order that it may engage with the front face of the resilient diaphragm material and act as a valve. Stainless steel does not react and become corroded when in contact with the diaphragm and will remain in operating condition for years. Holding the valve disc 61 in place and centralizing it in respect to the opening in the diaphragm and backing plate is the non-circular, longitudinally fluted valve guide 62 best seen in Fig. 2. It is longitudinally perforated and pressed over the stem 63 whose inner end is threaded into the diaphragm post 39 as clearly seen in Fig. 1.

The diaphragm is centrally attached to its backing plate 37 by means of a soft metal grommet 65 having a non-circular neck passing through correspondingly shaped openings in the backing plate and the diaphragm and being turned over as a narrow flange on the front face of the diaphragm just inside of the bead on the valve disc 61. It is also formed with a large flat flange engaging the back face of the backing plate and bordered by a high bead 66 having a dual function. It serves to centralize both the relief valve spring 67 which fits within it and the main pressure regulator spring 36, whose reduced inner end just closely fits outside of it. Relief valve spring 67 has its outer end reduced to fit loosely over the post 63 where it engages a self-locking nut 68 which is adjustable on post 63 by means of a socket wrench through opening 69 in the adjusting ring 34 on removal of cap nut 35. The general outline of the fluted valve guide 62 is the same as the non-circular opening in grommet 65 so as to prevent rotation of the former during adjustment of nut 68 which might cause bending of lever 41 in post hole 40. Any suitable configuration may be used. The flutes provide for free gas flow when necessary as clearly illustrated in Fig. 2.

The operation of the pressure relief valve will now be clear. If the main valve 19 is held open by some obstruction, or the like, diaphragm post 39 is thereby prevented from moving toward the left under the action of pressure on the front face of the diaphragm, which is increasing as the result of the stuck valve. When this pressure becomes great enough it overcomes the setting of relief valve spring 67 and moves the diaphragm toward the left, separating it from the bead on disc 61 secured to the diaphragm post. This permits the flow of excess gas under relatively high pressure beneath the valve disc 61 and through the flutes in the guide 62 into the rear diaphragm chamber to be carried off to the outdoors through a suitable pipe secured to the sput 70 welded to the rear diaphragm housing shell. This connects to the diaphragm chamber through a large opening 71 equal in diameter to the threaded bore for receiving the pipe. This insures against any restriction in flow.

In pressure regulators using the Pitot tube type of control, which is adequately explained in the above-identified prior application, there is a relatively restricted flow area between the outlet portion of the valve fitting and the front face of the diaphragm, which is inadequate to carry away excess pressure in the event that the main valve sticks open, so the structure of the present invention is equipped with a large passage closed by a spring held check valve to permit flow at high rate between the outlet chamber in the valve fitting and the front diaphragm chamber when this is needed. This passage 75, seen in Figs. 1 and 3, extends longitudinally entirely through the valve guide bushing 21 around most of the central valve stem guide portion. This passage is adapted to be closed at the left by means of valve disc 76 cooperating with the narrow seat 77 at the periphery of the bushing adjacent the chamfered edge thereof.

The valve stem 20 is guided in a thin brass tube fixed in the central bore in bushing 21 and extending beyond its left end, as shown at 78. It supports centrally perforated valve disc 76 with a close sliding fit. A conical spring 80 bears on the rear face of disc 76 and its outer end cooperates with flange 81 on tube 82 having a close pressed fit over tube 78, whereby it may be adjusted to fix the tension of spring 80 to prevent disc 76 from opening except under abnormal conditions. This disc is formed of some suitable semi-flexible material, such as synthetic rubber or Du Pont alython polyphene. There is no reason why it could not be made of a suitable metal, such as brass or the like. The spring 80 is quite light so that any slight excess pressure in chamber 18 on the outlet side of the valve fitting will cause gas to pass through passage 75 and lift valve disc 76 to gain access to the front face of the diaphragm and if the excess pressure persists, move the diaphragm away from the post and vent through the sput 70.

In the operation of conventional gas service pressure regulators having the relief valve incorporated in the valve fitting and discharging directly to atmosphere, pulsation of the operating diaphragm, which sometimes occurs to the detriment of the operational characteristics of the device, is damped out by having a very restricted breather vent in the casing on the air side of the diaphragm. In the instant construction this is not permissible since it is imperative that excess gas from high pressure be vented from the rear diaphragm chamber freely. In the regulator described in the prior application the Pitot tube extends entirely through the valve guide bushing and opens into the front chamber of the diaphragm at full diameter. This cannot be achieved in the present instance because of check valve 76 so the Pitot tube 50 is cut off only part way through the bushing and provided with a small radial bore 83 leading to one of the positioning channels 84 in the reduced diameter portion of the guide bushing, which channel is open to the diaphragm housing. This very restricted opening 83 acts to limit the rate of gas flow so that pulsations cannot build up. It takes the place of a restricted vent on the rear face of the diaphragm and insures excellent operation of the regulator. It eliminates the need for a check valve at the vicinity of the outlet sput 70 in the back face of the diaphragm housing.

With the standard arrangement of Pitot tube, or the arrangement shown with the restricted port 83, there is always the chance of certain over-shooting of the regulator because of the low rate of supply of regulated pressure to the diaphragm chamber. For example, if the regulator is supplying a rather large domestic furnace and the thermostatic control cuts the gas burner off instantly with a snap acting valve, there is a momentary jump in the reduced pressure because the Pitot tube cannot get this pressure into the diaphragm chamber fast enough to make the regulator cut off quickly. Here the check valve of the present invention comes into play and opens up the large passage between the discharge chamber of the valve fitting and the front face of the diaphragm so that regulation is continuous and smooth.

In Figs. 4 to 8, inclusive, are illustrated modifications of several of the parts of the pressure regulator such as may facilitate its construction, lower its cost or improve its operation. Any one of these might be incorporated in the regulator illustrated in Fig. 1, but preferably they should be all combined into a single regulator. Most of the major and many of the minor components of such a composite regulator are identical with those in the first illustrated form, and where this is true the same reference characters are used preceded by "1." Such parts are not defined here.

Fig. 4 illustrates primarily a simplified combination of diaphragm post and integral valve structure.

In this construction the diaphragm post 139 has formed integral therewith the circular flange 200 whose periphery is skirted and sharpened at the edge 201 either in the casting or by a suitable machining operation whereby it is capable of co-operating with the material of the diaphragm 130 to act as the valve. Also forming a part of the diaphragm post and integral therewith is the fluted guide portion 202 further illustrated in Fig. 5 where the cross-section is seen to be cruciform with the enlarged ends or heads having flat outer faces as seen at 206 to be closely guided within the walls 207 of the grommet which joins the backing plate to the diaphragm. The flat faces 206 engage the walls 207 to prevent any relative rotation of the post and diaphragm when adjustment of the spring tension is made as described in connection with the first embodiment. Likewise formed integral with the post is the screw 163, the whole being conveniently a die casting which can be made accurately to shape and requires only a minimum of machining to provide the actual valve edge.

Figs. 4 and 5 also show a modification of the grommet which attaches the backing plate to the diaphragm and acts as a guide for the fluted portion of the post assembly. This grommet includes a circular upstanding cup wall 208 which provides the location for the main regulator spring 136 and the relief valve spring 167. This wall is integral with a circular disc portion 209 which prior to use is perforated and radially slitted to provide for the four tabs 206 which may be bent outwardly through the square opening in the backing plate and down over the face of the diaphragm, as seen both in Figs. 4 and 5. The opening thus formed slides closely over 202.

Fig. 4 also illustrates a different form of sput 215 which is welded to the back diaphragm chamber wall as at 216 for which purpose the inner end of the sput is thinned as at 217. It also has a tapered outer end 218 and a threaded portion 219 to receive the nut 220 which secures the flared end of thin walled tube 221 to the sput in the form of a compression fitting. This materially simplifies the connection of the vent to the outside of a building, since the tubing, being thin, can be conveniently bent to follow any desired configuration. Any desired form of sput may be used to suit the required piping.

In Figs. 6, 7 and 8 are illustrated several changes in the valve stem guide bushing and guide sleeve which are reflected in slight changes in the check valve construction. It has been found convenient to make the bushing 121 as a die casting whereby it may have the several necessary diameters, flutes, passages and the like. The Pitot tube is made of some soft metal and preferably cast into position but the restricted hole 83 leading to the periphery for the passage of gas to the diaphragm chamber is drilled subsequently to provide the desired flow rate. In order to have a smooth effective guide for the valve stem 120 the tube 220 is preferably cast into the bushing and is flush with the inner end thereof but extends considerably from the outer end. In order to insure tight clamping of the tube in the casting, it is peripherally grooved as at 221. For convenience in manufacture such grooving is identical at both ends of the tube so it does not need to be oriented in the assembly operation prior to molding. Use is then made of the groove in the opposite end or free end to eliminate the need for the flanged bushing spring stop shown in the first embodiment. The apex end of the spring 180 is merely sized so that the inner convolution 223 is tight enough to snap into the groove 224 on the free end of the guide tube. This does not provide for any adjustment, but if the spring is accurately made none is needed. On the guide bushing itself the sharp raised ridge forming the valve seat has been eliminated in favor of the perfectly plane surface of narrow annular form, as seen at 225 in Figs. 6 and 8.

The combination of valves, both relief and check, as described above permits the operation of a regulator in a superior manner without restricting the use of the Pitot tube so essential for proper control under all conditions of load. In spite of the normally restricted passage from such tube, it is possible to arrange the excess pressure relief valve in the diaphragm and vent the gas from it through the back face of the diaphragm housing from the single outlet also serving to vent the housing should the diaphragm leak. Breathing is also achieved. The resulting pressure regulator not only operates in an extremely satisfactory manner but is entirely safe in all respects.

I claim:

1. In a pressure regulator in combination, a T fitting having a closure wall across the run thereof, a portion of said wall being normal to the axis of the base of the T and having a bore and seat, a bushing closing said base and having a guide tube therein about said axis and extending beyond the outer end of the bushing, a valve for said seat, a valve rod having close sliding fit in said tube, a Pitot tube mounted in the bushing extending toward the valve seat and having a restricted opening through the bushing, a large, high capacity passage through the bushing around said guide tube, a valve disc having a sliding fit on said guide tube extension and adapted to cover the outer end of said high capacity passage, and a spring on said tube extension biasing said disc against the end of said bushing remote from the Pitot tube.

2. In a gas service pressure regulator in combination, a flexible diaphragm, front and back diaphragm shells enclosing and edge-supporting the diaphragm, a valve for control by said diaphragm, a lever connected to actuate the valve, a backing plate secured to said diaphragm, said plate and diaphragm assembly having a non-circular central opening; a diaphragm post having a portion transversely bored to receive the end of said lever, a portion passing loosely through said non-circular opening and correspondingly shaped to prevent relative rotation of post and diaphragm, and a threaded rod extension; a nut adjustable on said extension, a spring compressed between said nut and backing plate, a valve seat disc carried by said post for engagement by the material of said diaphragm to close said opening under the action of said spring, and a vent in said back diaphragm shell having at least the flow capacity of said central opening in the diaphragm.

3. A gas service pressure regulator including in combination, a main valve controlling flow from a high pressure inlet to a regulated low pressure outlet, an operating lever for opening and closing said valve, a diaphragm having a non-circular central opening, front and back casing shells peripherally supporting said diaphragm, an integral post and valve unit having a fluted guide portion slidably and non-rotatively fitting in said opening, a flange on said unit at one end of said portion adapted to engage the diaphragm surrounding said opening, a post on said unit beyond the flange having a transverse opening, said lever extending substantially parallel to the plane of the diaphragm and having one end extending into said transverse opening for connecting said post and main valve, a rod extending axially from the other end of said guide portion and having an adjusting nut thereon, a spring extending between said nut and the diaphragm to press the latter against said flange whereby excess pressure on the front face of the diaphragm will compress the spring and separate the diaphragm and flange for flow of gas through the flutes and diaphragm opening, and a vent in said back diaphragm shell having at least the flow capacity of said central opening in the diaphragm.

4. The regulator of claim 3 in which the diaphragm is fitted with a backing plate having a similar central opening, and a grommet passing through the openings securing the plate and diaphragm together, said grommet having a similar non-circular central opening and an integral cupped portion to receive one end of said spring.

5. The pressure regulator of claim 1 in which said bushing is moulded about said guide tube, said tube being deeply grooved symmetrically at each end, one groove being engaged by the material of the bushing and the other receiving the end of said spring to anchor the same.

6. A gas service pressure regulator including, in combination, a main valve controlling gas flow from a high pressure inlet to a regulated low pressure outlet and having a predetermined maximum capacity, a diaphragm, front and back casing shells peripherally supporting said diaphragm, a post carried by said diaphragm, positive two-way operating linkage connecting said post and valve, a helical spring in the back shell urging said diaphragm towards valve opening position, a passage for delivering gas from the regulated low pressure outlet to the front casing shell to actuate the diaphragm and being sufficiently restricted to damp out diaphragm pulsations, a relief port and valve in said diaphragm adapted to provide a passage from the front to the back diaphragm casing shell on occurrence of excess pressure in the former and having at least the flow capacity of the main valve, a normally fully open vent in the back casing shell sized to handle the full discharge of the relief valve, means to deliver the full capacity of said main valve around said restricted passage on occurrence of excess pressure in the regulated low pressure outlet, a helical spring within the diaphragm spring, said diaphragm being resilient and flexible, a large rigid backing disc for said diaphragm having the same sized central port, a grommet having a neck closely fitting the ports, a flange thereon engaging the front face of the diaphragm, a flange engaging the outer face of the plate to secure it closely to the diaphragm, and a peripheral rim on said last mentioned flange surrounding and positioning the plate end of said relief valve spring and fitting within and centering the diaphragm spring end.

References Cited in the file of this patent

UNITED STATES PATENTS

| | | |
|---|---|---|
| 1,903,248 | Spence | Mar. 28, 1933 |
| 2,089,144 | Work | Aug. 3, 1937 |
| 2,252,152 | Work | Aug. 12, 1941 |
| 2,306,746 | Niesemann | Dec. 29, 1942 |
| 2,315,370 | Hughes | Mar. 30, 1943 |
| 2,543,203 | Roney | Feb. 27, 1951 |
| 2,616,659 | Grahling | Nov. 4, 1952 |
| 2,664,674 | Niesemann | Jan. 5, 1954 |
| 2,694,410 | Ey | Nov. 16, 1954 |

FOREIGN PATENTS

| | | |
|---|---|---|
| 118,353 | Sweden | of 1947 |
| 654,608 | Germany | Dec. 27, 1937 |